(12) United States Patent
Sturm et al.

(10) Patent No.: US 10,326,583 B2
(45) Date of Patent: Jun. 18, 2019

(54) LOW-POWER DATA BUS RECEIVER

(71) Applicant: MELEXIS TECHNOLOGIES NV, Tessenderlo (BE)

(72) Inventors: Jörgen Sturm, Weimar (DE); Thomas Freitag, Plaue (DE); Martin Bölter, Erfurt (DE); Anton Babushkin, Kiev (UA)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/981,269

(22) Filed: May 16, 2018

(65) Prior Publication Data

US 2018/0337766 A1 Nov. 22, 2018

(30) Foreign Application Priority Data

May 18, 2017 (EP) .................... 17171846

(51) Int. Cl.
*H04L 7/00* (2006.01)
*H04L 12/12* (2006.01)
*H04L 12/40* (2006.01)

(52) U.S. Cl.
CPC ............ *H04L 7/0087* (2013.01); *H04L 12/12* (2013.01); *H04L 12/40* (2013.01); *H04L 12/40039* (2013.01); *H04L 2012/40215* (2013.01)

(58) Field of Classification Search
CPC ..... H04L 7/033; H04L 7/0087; H04L 7/0331; H04L 7/0337; H04L 7/0008
See application file for complete search history.

(56) References Cited

U.S. PATENT DOCUMENTS

| 7,430,261 B2 | 9/2008 | Forest et al. |
| 8,989,210 B2 | 3/2015 | Hartwich et al. |
| 2007/0008195 A1* | 1/2007 | Jin ...................... H03M 1/1255 341/61 |

(Continued)

FOREIGN PATENT DOCUMENTS

WO 2014191785 A1 12/2014

OTHER PUBLICATIONS

Extended European Search Report from EP Application No. EP 17171846.3, dated Oct. 26, 2017.

(Continued)

*Primary Examiner* — Shuwang Liu
*Assistant Examiner* — Gina M Mckie
(74) *Attorney, Agent, or Firm* — Workman Nydegger (57) ABSTRACT

A circuit for receiving and processing a bit stream obtained from an electronic communication bus-system comprises a bit stream processor and bit sampling of the bit stream to provide a sampled output signal. The circuit comprises a frame decoder for decoding a data frame encoded in the sampled output signal, and a clock signal generator for generating a first clock signal for the bit stream processor. The circuit comprises a clock signal downsampler for generating a second clock signal having a lower frequency than the first clock signal, in which the second clock signal is based on a co-occurrence of a clock pulse in the first clock signal and the emission of a bit in the sampled output signal. The bit stream processor is adapted for synchronizing the first clock signal to an external protocol timing of the incoming bit stream.

15 Claims, 3 Drawing Sheets

(56) References Cited

U.S. PATENT DOCUMENTS

2013/0173949 A1    7/2013  Cai et al.
2014/0270033 A1    9/2014  Richards
2016/0365969 A1*  12/2016  Ministeru ............. H04L 1/0045

OTHER PUBLICATIONS

"Road Vehicles—Controlller Area Network (CAN)—Part 5: High-Speed Medium Access Unit with Low-Power Mode," International Organization Standardization, ISO 11898-5, First Edition, Jun. 15, 2007, 28 Pages.

"Road Vehicles—Controlller Area Network (CAN)—Part 6: High-Speed Medium Access Unit with Selective Wake-Up Functionality," International Organization Standardization, ISO/DIS 11898-6, 2012, 23 Pages.

\* cited by examiner

LOW-POWER DATA BUS RECEIVER

FIELD OF THE INVENTION

The invention relates to the field of electronic data communication bus-systems, e.g. to controller area network (CAN) buses. More specifically it relates to a receiver circuit for receiving data through an electronic data communication bus-system, e.g. over a CAN bus, an integrated circuit device for transmitting and/or receiving data through an electronic data communication bus-system, e.g. over a CAN bus, and related methods.

BACKGROUND OF THE INVENTION

In devices adapted for transmitting and/or receiving information via a digital data communication bus-system, it can be advantageous to provide a low-power bus monitoring mode of operation, in which the device conservatively consumes power to monitor incoming data transmitted over the data bus to detect a signal or message intended to instruct the device to resume a normal mode of operation.

For example, it is known in the art for Control Area Networks (CAN), e.g. in accordance with the standard ISO11898-6, to provide a selective wake-up functionality. This may advantageously allow a reduction of power consumption in such network. For example, a node on a CAN bus system in a vehicle may not be needed a large fraction, e.g. 80%, or even higher, e.g. 90% or 95%, of the time. While a node without selective wake-up capabilities might consume, for example, a few watts of power, e.g. 2 W, when waiting for a request, a node or group of nodes can be maintained in the selective wake-up state without wasting power in a CAN network that supports partial networking, as known in the art. Thus, power consumption can be severely reduced during an idle mode of a node when the node does not need to be active.

Partial networking enables a node or group of nodes to be woken separately from other nodes connected to the bus system. A wake-up signal may be transmitted in the form of a predetermined CAN message, e.g. as opposed to a generic wake-up in response to any bus activity, such as defined by the standard ISO11898-5. However, the CAN transceiver device may thus be required to monitor and analyze a bit stream transmitted via the bus for specific wake-up messages under severe power limitations, e.g. since only limited power consumption is allowed during its inactive state. For this, the receiver needs to be able to properly sample the incoming data bit stream, while, for example, clock accuracy in this inactive mode can be limited due to the power requirements.

The U.S. Pat. No. 8,989,210 discloses a method for unambiguously waking users of a bus system. The method involves a multi-phase approach to decide if a bus node wakes from its inactive state based on a message transmission over the bus. In a first phase, an incoming message is detected. In a second phase, the correct communication protocol for the message is validated, and in a third phase, the bus node can be selected by processing logic information in the message.

The U.S. Pat. No. 7,430,261 discloses a method and a bit stream decoding unit that uses majority voting. It this method, a detection window is defined, and majority voting on consecutive samples is used to detect a bit value. This sampling approach is repeated to determine each bit of the transmitted data bit stream.

SUMMARY OF THE INVENTION

It is an object of embodiments of the present invention to provide efficient means and methods for low-power processing of a bit stream transmitted through an electronic data communication bus-system, e.g. a Controller Area Network, e.g. in an integrated circuit that implements an Electronic Control Unit for receiving and/or transmitting data on a CAN bus, e.g. in a CAN transceiver.

The above objective is accomplished by a method and device according to the present invention.

It is an advantage of embodiments of the present invention that bit stream synchronization is provided to enable accurate data sampling of the bit stream in a low power consumption mode of the device, e.g. of a CAN node.

Where reference is made to a low power consumption mode or low power mode, this may refer to a power saving mode of operation of the device that is characterised by a substantially lower power consumption than a normal, or active, mode of operation, in which the device processes an incoming data bit stream only to detect a predetermined wake-up message, e.g. a predetermined wake-up message specifically assigned to that node or a cluster of nodes, e.g. a subnetwork, to which the node is assigned. For example, this may particularly refer to a low power mode pursuant the standard ISO11898-6.

It is an advantage of embodiments of the present invention that a low-cost RC oscillator can be used in a method or device in accordance with embodiments of the present invention for precise and low-power bit stream sampling.

It is an advantage of embodiments of the present invention that power efficient and accurate CAN data bit stream processing is provided that is suitable for CAN partial networking in a low-power mode, e.g. using a power efficient clock source having a limited precision, e.g. a low precision.

It is an advantage of embodiments of the present invention that a CAN node can be provided that has only a few components that require a high frequency clock.

It is an advantage of embodiments of the present invention that a high precision oscillator, e.g. a crystal oscillator (XTAL), and/or a high-speed high-precision clock signal, e.g. generated by a PLL, is not required for providing a fixed clock reference signal, e.g. at least when operating in a low power mode.

In a first aspect, the present invention relates to a receiver circuit for receiving an incoming bit stream obtained from an electronic communication bus-system and for processing the incoming bit stream. The receiver circuit comprises a bit stream processor, e.g. a bit stream processing unit, for bit stream synchronization and bit sampling of the incoming bit stream to provide a sampled output signal. The receiver circuit comprises a frame decoder, e.g. a frame decoding unit, for decoding a data frame encoded in the sampled output signal, and a clock signal generator for generating a first clock signal and for supplying the first clock signal to the bit stream processor such that the bit stream processor operates at the frequency of the first clock signal. The receiver circuit also comprises a clock signal downsampler for generating a second clock signal having a lower frequency than the first clock signal, the second clock signal being generated based on a co-occurrence, e.g. a simultaneous occurrence, of a clock pulse in the first clock signal and the emission of a bit in the sampled output signal provided by the bit stream processor. The clock signal downsampler is also adapted for providing the second clock signal to the frame decoder, such that the frame decoder operates at the frequency of the second clock signal. The bit stream processor is adapted for synchronizing the first clock signal to an external protocol timing of the incoming bit stream.

In a receiver circuit in accordance with embodiments of the present invention, the frame decoder may be adapted for decoding a data frame in the sampled output signal (in accordance with a Controller Area Network protocol.

A receiver circuit in accordance with embodiments of the present invention may comprise a wake-up decision unit, e.g. a wake-up decider, for detecting a selective wake-up message in data frame information provided by the frame decoder and for generating a wake-up signal in response to the selective wake-up message. The second clock signal may be provided to the wake-up decision unit such that the wake-up decision unit operates at the frequency of the second clock signal.

In a receiver circuit in accordance with embodiments of the present invention, the clock signal downsampler may generate the second clock signal as having a frequency corresponding to a baud rate frequency of the processed data stream.

In a receiver circuit in accordance with embodiments of the present invention, the clock signal downsampler may generate the second clock signal by gating the first clock signal with the sample output indicator signal generated by the bit stream processor.

In a receiver circuit in accordance with embodiments of the present invention, the clock signal generator may comprise an oscillator having a precision in the range of 1% to 10%.

In a receiver circuit in accordance with embodiments of the present invention, the clock signal generator may comprise an RC oscillator.

In a receiver circuit in accordance with embodiments of the present invention, the bit stream processor may comprise a synchronizer adapted for synchronizing the incoming bit stream to be in sync with the first clock signal and for generating a bus synchronization signal. The bit stream processor may comprise an edge detector for detecting a falling edge pattern in the synchronized bit stream and generating a detected falling edge signal.

In a receiver circuit in accordance with embodiments of the present invention, the edge detector may comprise a shift register for storing data samples of the incoming bit stream and a comparator for detecting a falling edge by comparison of at least two values stored in the shift register and the bus synchronization signal provided by the synchronizer to a predetermined falling edge pattern such as to generate the detected falling edge signal.

In a receiver circuit in accordance with embodiments of the present invention, the bit stream processor may comprise an edge validator, e.g. an edge validation unit that comprises:

a counter adapted for restarting a count at each detected falling edge as conveyed by said detected falling edge signal, a sample selector for selecting samples from the digital input data after the detected falling edge at predetermined counter values of the counter, and a comparator for validating the selected samples to ascertain validity of the detected edge by majority voting, and for generating a valid edge signal.

In a receiver circuit in accordance with embodiments of the present invention, the bit stream processor may comprise a bit sampler, e.g. a bit sampling unit, that comprises a sample selector for taking a sample at a predetermined instant in a current bit frame and for providing said sample via said sampled output signal.

In a receiver circuit in accordance with embodiments of the present invention, the sample selector may furthermore be adapted for selecting a plurality of data frame validation samples at a plurality of predetermined count values of the counter, in which the bit sampler comprises a further comparator adapted for applying a majority voting to detect a stable dominant state on the communication bus to detect a valid frame. The bit sampler may comprise a further counter that is adapted for resetting when the valid frame is detected and for resetting when a predetermined count value, corresponding to a ratio of the frequency of the first clock signal and a transmission baud rate of the communication bus-system, is reached. The sample selector may be adapted for taking the sample at the predetermined instant in the current bit frame as indicated by a further predetermined count value of the further counter.

In a second aspect, the present invention also relates to an integrated circuit device for transmitting and/or receiving data via an electronic communication bus-system. The device comprises a transceiver, wherein the transceiver comprises a bus-system connector for interfacing with the electronic communication bus-system and a receiver circuit in accordance with embodiments of the first aspect of the present invention for processing incoming data obtained from the electronic communication bus-system via the bus-system connector.

An integrated circuit device in accordance with embodiments of the present invention may be a Controller Area Network node for transmitting and/or receiving data through the electronic communication bus-system in the form of a Controller Area Network bus-system, e.g. the electronic communication bus-system being a Controller Area Network bus-system.

In an integrated circuit device in accordance with embodiments of the present invention, the integrated circuit device may be adapted for supporting selective wake-up and/or partial networking of the Controller Area Network bus-system.

In an integrated circuit device in accordance with embodiments of the present invention, the bus-system connector may comprise an analog front-end bus interface for converting an analog signal received from the electronic communication bus-system to a digital format.

In a third aspect, the present invention relates to a method for processing an incoming bit stream obtained from an electronic communication bus-system. The method comprises generating a first clock signal. The method comprises using a bit stream processor to synchronize the first clock signal to an external protocol timing of the incoming bit stream and to bit-sample the incoming bit stream such as to provide a sampled output signal. The bit stream processor is clocked by the first clock signal. The method comprises generating a second clock signal having a lower frequency than the first clock signal, the second clock signal being generated based on a co-occurrence of a clock pulse in the first clock signal and the emission of a bit in the sampled output signal provided by the bit stream processor. The method comprises using a frame decoder to decode a data frame encoded in the sampled output signal, the frame decoder being clocked by the second clock signal.

In a method in accordance with embodiments of the present invention, the decoding of the data frame may comprise decoding the data frame in accordance with a Controller Area Network protocol. The method may furthermore comprise using a wake-up decision unit, e.g. a wake-up decider, to detect a selective wake-up message in the decoded data frame and to generate a wake-up signal in response to the selective wake-up message, in which the wake-up decision unit is clocked by the second clock signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a receiver circuit for receiving an incoming bit stream obtained from an electronic communication bus-system, such as a CAN bus-system, and for processing the incoming bit stream. The receiver circuit comprises a bit stream processing unit for bit stream synchronization and bit sampling of the incoming bit stream to provide a sampled output signal. The receiver circuit comprises a frame decoding unit for decoding a data frame encoded in the sampled output signal. The receiver circuit comprises a clock signal generator for generating a first clock signal and for supplying the first clock signal to the bit stream processing unit such that the bit stream processing unit operates at the frequency of the first clock signal, e.g. is clocked by the first clock signal. The receiver circuit also comprises a clock signal downsampler for generating a second clock signal having a lower frequency than the first clock signal, in which the second clock signal is generated based on a co-occurrence of a clock pulse in the first clock signal and a bit emitted in the sampled output signal provided by the bit stream processing unit. The clock signal downsampler is also adapted for providing the second clock signal to the frame decoding unit, such that the frame decoding unit operates at the frequency of the second clock signal. The bit stream processing unit is adapted for synchronizing the first clock signal to an external protocol timing of the incoming bit stream, e.g. an external communication protocol timing corresponding to the incoming bit stream. The bit stream processing unit is adapted for bit-sampling the incoming bit stream at sampling time points, such as to provide the sampled output signal.

Embodiments of the present invention may also relate to an integrated circuit device for transmitting and/or receiving data through an electronic communication bus-system, the device comprising a transceiver, in which the transceiver comprises a bus-system connector for interfacing with the electronic communication bus-system and a receiver circuit in accordance with embodiments of the present invention for processing incoming data obtained from the electronic communication bus-system via the bus-system connector. The integrated circuit device may be a Controller Area Network node for transmitting and/or receiving data through the electronic communication bus-system, being a Controller Area Network bus-system. The integrated circuit device may be adapted for supporting selective wake-up and/or partial networking of the Controller Area Network bus-system.

Figure 1:
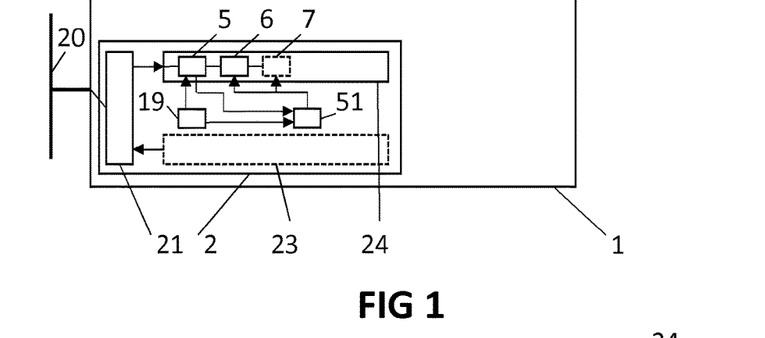
FIG. 1 illustrates schematic overview of a device in accordance with embodiments of the present invention.

Referring to FIG. 1, an integrated circuit device 1 for transmitting and/or receiving data through an electronic communication bus-system 20 in accordance with embodiments of the present invention is shown.

Figure 2:
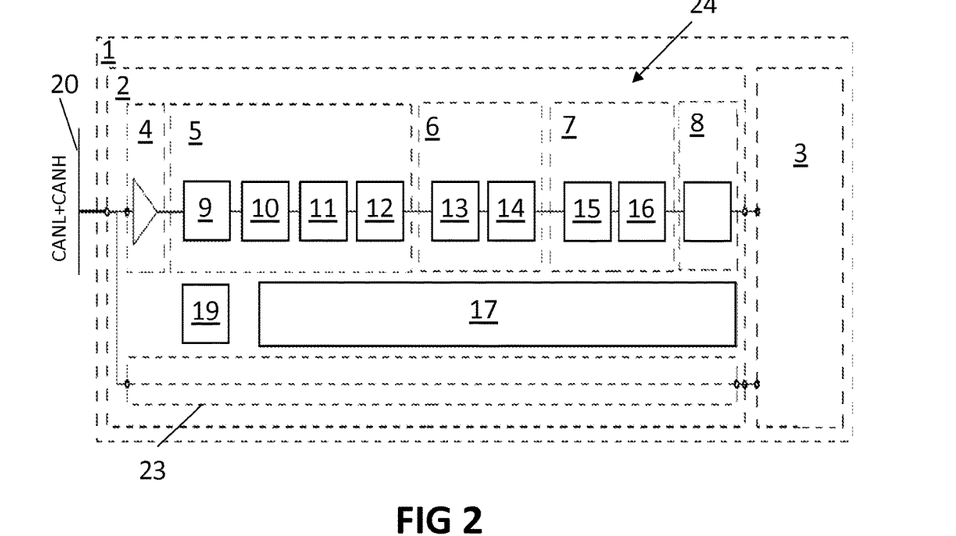
FIG. 2 shows a device in accordance with embodiments of the present invention.

For example, referring to FIG. 2, the electronic communication bus-system 20 may comprise at least one signal carrying conductor, e.g. at least one wire. For example, the electronic communication bus-system may be a Controller Area Network (CAN) bus-system, e.g. comprising a pair of bus data signal carrying conductors CANL,CANH.

The integrated circuit device 1 may be a CAN node, e.g. particularly a CAN node supporting selective wake-up and/ or partial networking (PN), e.g. adapted for supporting CAN network selective wake up according to an ISO/DIS 11898-6 standard.

The device 1 comprises a transceiver 2 that comprises a bus-system connector 21 for interfacing with the electronic communication bus-system 20, e.g. adapted for operably connecting to a pair of signal carrying conductors CANL, CANH of a CAN bus-system. The transceiver may comprise to a circuit adapted for transmitting data to the electronic communication bus-system 20 and for receiving data from the electronic communication bus-system 20. The bus-system connector 21 may, for example, comprise an analog front-end bus interface 4, e.g. as shown in FIG. 2, for converting an analog signal received from the electronic communication bus-system 20 to a digital format, e.g. as known in the art.

The transceiver 2 comprises a receiver circuit 24 for processing incoming data obtained from the electronic communication bus-system, e.g. via the bus-system connector 21, in a processing chain forming a receive path.

The transceiver may also comprise a transmitter circuit 23 for processing outgoing data to be provided to the electronic communication bus-system, e.g. via the bus-system connector 21, in a processing chain forming a transmit path. The transmitter circuit 23 may be a transmitter circuit, as known in the art, suitable for generating, e.g. based on a digital input signal, an output signal suitable to be transmitted over the electronic communication bus-system in accordance with a predetermined communication bus-system specification, e.g. in accordance with a Controller Area Network specification.

The receiver circuit 24 and the transmitter circuit 23 may refer to features of a functional topology, and not necessarily to entirely separate physical components of the transceiver, e.g. the receiver circuit and the transmitter circuit may share at least one circuit element, e.g. a support component 17 and/or a clock signal generator 19, but embodiments are also not necessarily limited to any shared usage of components in the receive path and the transmit path.

The transceiver 2 may comprise at least one support component 17, such as a component for monitoring of a function of the transceiver, a component for regulating a power supply, and/or similar support circuits as known in the art.

The receiver circuit 24 comprises a clock signal generator 19 for generating a first clock signal 32 and supplying this first clock signal 32 to a bit stream processing unit 5. The clock signal generator 19 may comprise an oscillator, e.g. may comprise a low precision oscillator, e.g. a low-power oscillator having a low precision. The oscillator may have a precision in the range of 1% to 20%, e.g. in the range of 2% to 10%, e.g. about 7.5% or about 5%. The oscillator may have an oscillation frequency in the range of 100 kHz to 64 MHz, e.g. in the range of 1 MHz to 32 MHz, e.g. in the range of 2 MHz to 16 MHz, e.g. in the range of 4 MHz to 8 MHz, e.g. 8 MHz. The clock signal generator 19 may comprise an analog electronic circuit. The clock signal generator may comprise an RC oscillator 33, e.g. a trimmable RC oscillator.

The receiver circuit 24 also comprises a clock signal downsampler 51 for generating a second clock signal 60 having a lower frequency than the first clock signal, based on co-occurrence of a clock pulse in the first clock signal and a bit emitted in the sampled output signal provided by the bit stream processing unit 5.

The clock signal downsampler 51 may generate the second clock signal by gating the first clock signal with the sampled output indicator signal 53 generated by the bit stream processing unit 5. The second clock signal has a lower frequency than the first clock signal, e.g. may correspond to the baud rate frequency of the processed data stream.

The second clock signal may be provided to a frame decoding unit 6 and wake up decision unit 7, such that these units operate at the lower frequency of the second clock signal.

Figure 3:
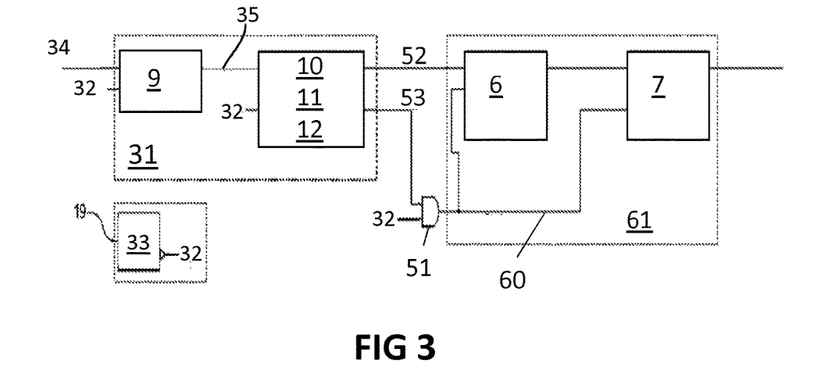
FIG. 3 illustrates different clock domains in a device in accordance with embodiments of the present invention.

Referring to FIG. 3, since the blocks in the time domain 61 corresponding to the second clock signal 60 may contain a majority of the clocked components in the receiver circuit, for processing a selective wake-up, those blocks may contribute substantially to power consumption. For example, the bit stream processing unit 5 may correspond to about 20% of the total complexity of the receiver circuit. For example, embodiments of the present invention not being limited to such specific example, when the clock frequency of the second clock signal is $1/16^{th}$ of the clock frequency of the first clock signal, the digital power consumption of about 80% of the logic of the receiver circuit may be reduced to about $1/16^{th}$, e.g. such that a total power saving of about 75% may be achieved as compared to running the entire receiver logic chain at the fast clock speed of the first clock signal.

It is an advantage that a low-cost and power-efficient oscillator can be used in a device in accordance with embodiments of the present invention. For example, the power consumption of a CAN slave node may be reduced, in accordance with embodiments of the present invention, by introduction of a slow clock, i.e. the second clock signal, to clocked elements of that slave node, e.g. a majority of the clocked elements of that slave node, while limiting the use of a fast clock signal, i.e. the first clock signal, supplied by the oscillator 19 to a small set of clocked components of the node.

The receiver circuit 24 comprises a bit stream processing unit 5 adapted for bit stream synchronization and bit sampling of an incoming bit stream received via the electronic communication bus-system 20, e.g. digital input data 34 provided by the analog front-end bus interface 4. Thus, the bit stream processing unit 5 is adapted for synchronizing the first clock signal 32 generated by the clock signal generator 19 to the external protocol timing of the incoming bit stream received via the electronic communication bus-system 20. The bit stream processing unit 5 may furthermore be adapted for bit sampling the incoming bit stream at optimized sampling time points, such as to provide a sampled output signal 52. The bit stream processing unit 5 may also be adapted to emit a sample output indicator signal 53 for indicating when an output sample bit is emitted in the sampled output signal 52, e.g. for controlling the gating of the first clock signal to provide the second clock signal.

Figure 4:
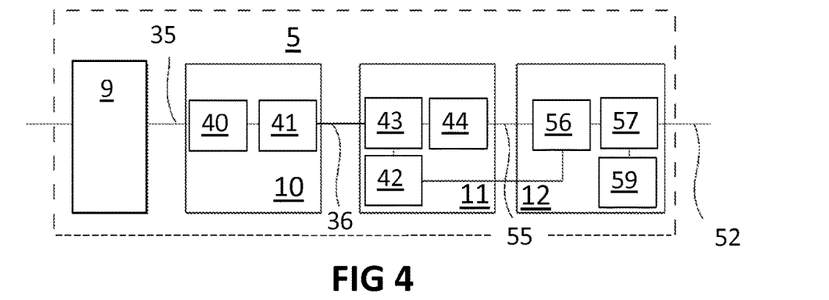
FIG. 4 shows a bit stream processing unit in a device in accordance with embodiments of the present invention.

The bit stream processing unit 5 may comprise a synchronizer 9, an edge detector 10, an edge validation unit 11 and/or a bit sampling unit 12.

For example, the synchronizer 9, the edge detector 10, the edge validation unit 11 and/or the bit sampling unit 12 may receive the first clock signal generated by the clock signal generator 19, e.g. to operate in the clock domain 31 corresponding to the first clock signal 32 provided by the clock signal generator 19.

The synchronizer 9 may be adapted for synchronizing a bit stream 34 received via the electronic communication bus-system 20, e.g. an incoming CAN bit stream, to be in sync with the first clock signal 32 provided by the clock signal generator 19, e.g. by multiple input sampling and/or filtering of an incoming bit stream signal 34 obtained from the bus-system connector 21, e.g. provided by an analog front-end bus interface 4, e.g. such as to provide a synchronized bit stream, e.g. by emitting a bus synchronization signal 35 indicating that the data stream timing and the first clock signal are synchronized within a predetermined tolerance margin. The synchronizer may implement standard synchronization technologies as known in the art. For example, the synchronizer may be adapted for compensating for a physical delay time between a transmitter on the electronic communication bus-system 20 where an incoming bit stream originates and the device 1. For example, the synchronizer may be adapted for compensating for variations in the first clock signal 32, e.g. due to temperature or voltage fluctuations, and/or variations in the transmission baud rate of the incoming signal.

The edge detector 10 is adapted for detecting a falling edge pattern in the synchronized bit stream. For example, instead of symmetrically detecting rising and falling edges to generate a bit stream out of incoming data, only falling edges may be detected, in some embodiments according to the present invention. It is an advantage that the falling edges, e.g. in which the signal changes from recessive to dominant, may have a steeper slope with respect to time than rising edges, e.g. in which the signal changes from dominant to recessive.

Referring to FIG. 4, the edge detector 10 may comprise a shift register 40 and a comparator 41. Data samples of the digital input data 34 may be loaded into the shift register 40 and the comparator 21 may be adapted for detecting a falling edge by comparison of at least two values stored in the shift register 40 and the bus synchronization signal 35 provided by the synchronizer 9. For example, the digital input data 34 may be sampled on an edge, e.g. a rising edge, of the first clock signal 32 and loaded into the shifter. The detected falling edge may be output in the form of a detected falling edge signal 36.

Figure 5:
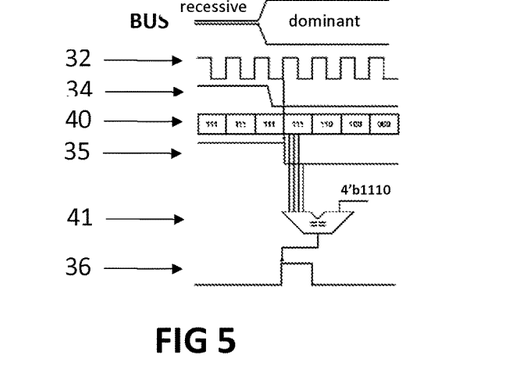
FIG. 5 shows a signal timing diagram relating to a synchronization in a device in accordance with embodiments of the present invention.

For example, referring to FIG. 5, the shift register 40 may be a three-bit shifter and the comparator may be a four-bit comparator for comparing the three bits in the shift register and a synchronised bus value with a falling edge pattern, e.g. a 4'hE pattern (i.e. a hexadecimal 0xE or binary 1110 value). For example, the comparator may detect a pattern in which the most recent bit value inserted into the shift register is 0, while the previous two bit values and a synchronized bus value are 1.

A bit width of three bits for the shift register may advantageously provide sufficient robustness against bus ringing or other disturbances, e.g. in combination with a 4'hE pattern for the combination with the synchronization bus value as described. However, the width of the shifter and/or the comparator may differ from this example in accordance with embodiments of the present invention, e.g. according to specific application requirements.

The bit stream processing unit 5 may furthermore comprise an edge validation unit 11, e.g. to advantageously improve robustness and noise resistance of the falling edge recognition.

The edge validation unit 11 may comprise a counter 42 and a sample selector 43 for selecting a sample from the digital input data 34 after the detected falling edge signal 36, taking a counter value of the counter 42 into account. The sample selector may be adapted for selecting the sample as a number of values sampled from the digital input data 34 after a detected falling edge, e.g. at predetermined times, e.g. corresponding to predetermined counter values, with respect to a detected falling edge, e.g. as conveyed by the detected falling edge signal 36. Thus, stability of the signal in a time frame following a detected falling edge may be ensured, e.g. by sampling at predetermined moments in time after the detected edge in which the incoming data stream is assumed to remain at a stable level. The sample selection may advantageously provide stability against external disturbances in the incoming bit stream. The edge validation unit 11 may furthermore comprise a comparator 44 for validating the selected samples, e.g. to ascertain validity of an edge in a predetermined position relative to the selected sample, as e.g. a start bit detection or a synchronization sequence.

Figure 6:
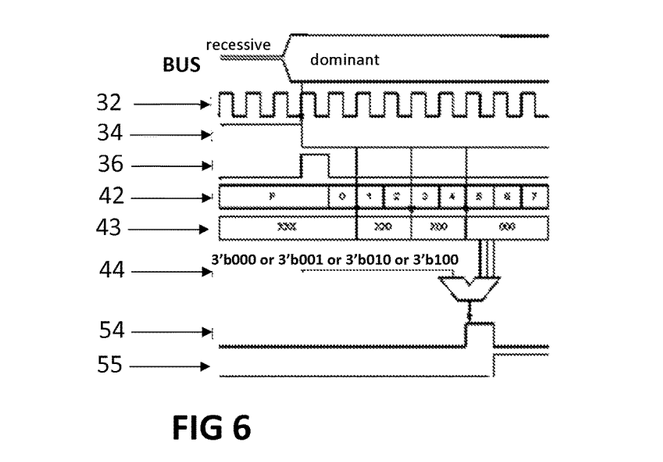
FIG. 6 shows a signal timing diagram relating to a falling edge detection and validation in a device in accordance with embodiments of the present invention.

In the following example, as illustrated in FIG. 6, a bit time is divided into 16 time quanta. However, the number of 16 time quanta is used for illustrative purposes only, and embodiments of the present invention are not limited thereto. For example, the first clock signal may have a frequency, in accordance with this example, that is sixteen times the baud rate of the transmitted signal received from the communication bus.

The sample selector 43 may select, for example, predetermined time quantum bits in a single bit time frame, e.g. the first, third and fifth time quantum bit. The counter 42 may restart for each bit time frame, e.g. at each detected falling edge, thus indexing the time quanta of the digital input data 34 over the communication bus relative to the most recently detected falling edge.

The comparator 44 may receive the selected bits to validate the falling edge using majority voting. For example, the comparator may compare the values to match with a predefined pattern, for example a match with 3'b000 as indicative of no apparent noise in the signal or a match with patterns 3'b001, 3'b010 or 3'b100 as indicative for detected noise while a majority vote of 0 can be ascertained. For example, the presence of a single noise sample out of three may be allowed.

For example, when the detected falling edge signal 36 indicates a detected falling edge, the counter 42 may be started and memory elements of the sample selector 43 may be loaded with the digital input data 34 at the counter values 1 and 3. At counter value 5, the two previously stored bus values, e.g. from times corresponding to the counter values 1 and 3, are compared to the most recent digital input data value. Only if a majority of those bits is equal to 0, the falling edge may be validated. This is indicated by the valid edge signal 54 and its sampled pendant validity signal 55, which maintains the validity information of a detected falling edge for a subsequent bit sampling stage.

After a falling edge is detected, as described hereinabove, the time until a sampling point may be used for further filtering the incoming data. The data may be accepted only when it is stable for multiple samples, which are selected by the sample selector 43. Which sample(s) to use may depend on the width of the comparator 44 and the available time after having detected the falling edge until a sample point to be used for data sampling is reached. For the purpose of sample selection, the counter 42 may be started with the falling edge.

The bit sampling unit 12 may determine a sampling point, e.g. an optimized sampling point in time, e.g. an optimal sampling point, based on the input of the edge validation unit 11, e.g. the detected falling edge signal 36. The bit sampling unit 12 may use the counter 42 of the edge validation unit 11 or may comprise a separate counter 59 adapted to (re)start counting at a predetermined time quantum in each bit frame, e.g. at the detection of a valid frame, such as to keep the sampling points substantially uniformly spaced in bit-quantized time. The bit sampling unit 12 may comprise a sample selector for taking a sample at the determined sampling point, e.g. at a predetermined count of the counter. The bit sampling unit may be adapted to provide the sample via the sampled output signal 52, and feed this information to the frame decoding unit 6. The bit sampling unit 12 may also be adapted to emit a sample output indicator signal 53 for indicating when an output sample bit is emitted in the sampled output signal 52, e.g. for controlling the gating of the first clock signal to provide the second clock signal.

A fixed clock ratio, e.g. a fixed and predetermined clock ratio, may be assumed between incoming data and the first clock signal. For example, the device may be adapted for receiving a communication stream over the communication bus having a predetermined baud rate, and the clock signal generator 19 may be adapted for generating the first clock signal having a frequency that is a predetermined integer multiple of that baud rate. This ratio can be selected so that the sample point fits to the conditions defined by the incoming data stream. For example, for CAN data, a window between 55% and 95% of an ideal bit time can be allowed for data sampling. Continuing the example given hereinabove, embodiments of the present invention not being limited thereto, a ratio of 1 over 16 between the transmission baud rate and the frequency of the first clock signal may be selected.

Figure 7:
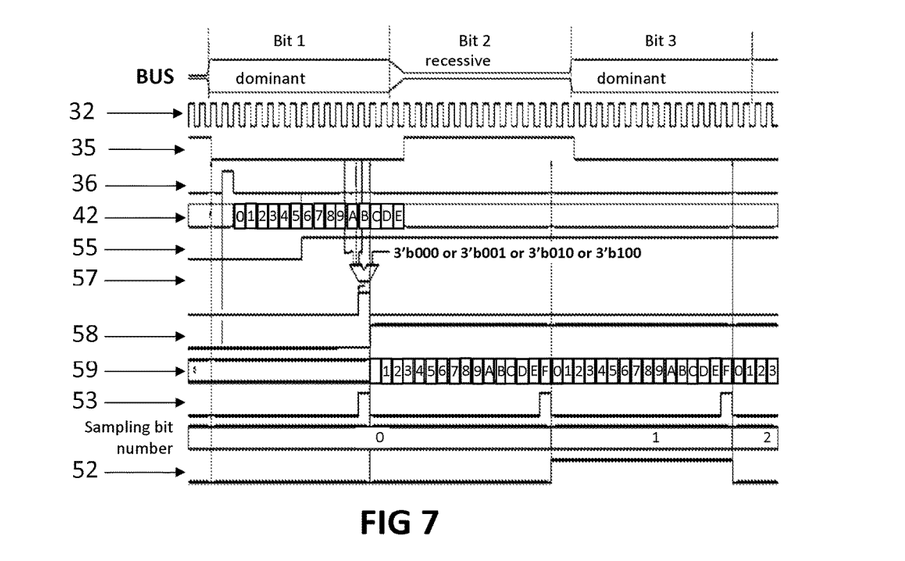
FIG. 7 shows a signal timing diagram relating to a bit sampling in a device in accordance with embodiments of the present invention.

Referring to FIG. 7, in this example, the sample point may be set to be after the $13^{th}$ of 16 clock pulses for each bit frame, e.g. at $13/16=81.25\%$. However, embodiments of the present invention are not limited thereto, e.g. other settings are possible according to the baud rate to clock ratio and the targeted sample point within the timeframe of a bit.

In the example of a CAN bus implementation, a valid data frame may be started by a dominant start bit. Thus, an additional validation of the dominant bit may be implemented by the bit sampling unit 12. For example, if the sampled pendant validity signal 55 indicates a validly detected edge, the bit-sampling sample selector 56 may select a plurality of data frame validation samples at a plurality of predetermined sampling points, e.g. at predetermined count values of the counter 42 of the edge validation unit 11, e.g. to select the samples indexed by counter values 9, 10 and 11 with respect to a zero reference index at the detected falling edge. The bit sampling unit 12 may comprise a further comparator 57 adapted for applying a majority voting to detect a stable dominant state on the communication bus. In case of noise or disturbances, the bit sampling may be aborted, and the bit stream may be reset to synchronize on the next falling edge.

When a successful majority vote to a dominant (e.g. =0) level is ascertained by the comparator 57, an internal signal 58 for indicating that the frame is valid may be set and the further counter 59 may be reset, e.g. started, which may be restarted after a number of counts in accordance with the clock ratio, e.g. restarted after 16 periods. Thus, the counting interval may be defined by the ratio between the first clock signal frequency and the baud rate frequency, as described hereinabove. The comparator 57 may generate a signal to sample the incoming bit stream. This signal may be provided as the sample output indicator signal 53 for gating the first clock signal to generate the second clock signal.

The receiver circuit 24 comprises a frame decoding unit 6. The frame decoding unit may comprise a de-stuffing unit 13. Such frame decoding units are known in the art, e.g. for decoding a data frame, e.g. encoded in the bit stream transferred from the bit sampling unit 12 via the sampled output signal 52. The frame decoding unit 6 may be adapted for decoding a CAN frame.

The receiver circuit 24 comprises a wake-up-decision unit 7. The wake-up decision unit may comprise a frame processing unit 15 for processing data frame information provided by the frame decoding unit 6. The wake-up decision unit 7 may be adapted for detecting a selective wake-up message specifically targeted at the device, or at a cluster of devices the device is a member of, e.g. a selective wake-up message in accordance with a CAN protocol standard, and generating a wake-up signal in response to such message.

The device 1 may also comprise a microcontroller 3 for handling a communication protocol, or alternatively, an output port for connecting to an external processor for handing the communication protocol. The communication protocol may be a CAN protocol. For example, the microcontroller, or the external processor, may implement an Electronic Control Unit (ECU) for receiving and/or transmitting data over the bus-system in accordance with the CAN protocol. The microcontroller, or the external processor, may furthermore be adapted for implementing a device-specific function, e.g. a sensor function and/or a control function, e.g. controlled by and/or reported via the communication bus-system.

The receiver circuit 24 may further comprise an interface unit 8 for interfacing the receiver circuit 24 with the microcontroller 3 or the external processor.

It is an advantage of embodiments of the present invention that synchronisation of the incoming data stream to the data sampling can be performed in a power-efficient manner, e.g. in a low-power or power saving mode, without requiring specific low-power processing of message content to wake up a bus node. For example, a synchronisation pattern as a sequence of predefined signal edges may not be required for detecting a wake-up message.

Particularly, the frame decoding unit 6 and the wake-up decision unit 7 can work at a reduced clock frequency, e.g. substantially at the baud rate frequency of the transmitted data stream over the communication bus. Since the frame decoding unit and the wake-up decision unit receive an error-corrected bit stream, e.g. the reconstructed bit stream as presumably transmitted over the bus, to be analysed further by these components, oversampling or filtering are no longer required at this stage, such that the clock frequency can be lowered, e.g. to minimum required as imposed by the transmission baud rate.

In a second aspect, the present invention also relates to a method for processing an incoming bit stream obtained from an electronic communication bus-system. The method comprises generating a first clock signal. The method comprises using a bit stream processing unit to synchronize the first clock signal to an external protocol timing of the incoming bit stream and to bit-sample the incoming bit stream such as to provide a sampled output signal. The bit stream processing unit is clocked by the first clock signal. The method comprises generating a second clock signal having a lower frequency than the first clock signal, in which the second clock signal is generated based on a co-occurrence of a clock pulse in the first clock signal and the emission of a bit in the sampled output signal provided by the bit stream processing unit. The method comprises using a frame decoding unit to decode a data frame encoded in the sampled output signal, in which the frame decoding unit is clocked by the second clock signal.

In a method in accordance with embodiments of the present invention, the decoding of the data frame may comprise decoding the data frame in accordance with a Controller Area Network protocol.

A method in accordance with embodiments of the present invention may also comprise using a wake-up decision unit to detect a selective wake-up message in the decoded data frame and to generate a wake-up signal in response to the selective wake-up message, in which the wake-up decision unit is clocked by the second clock signal.

Further steps of a method, and/or details concerning a step of a method, in accordance with embodiments of the present invention will be clear from the description provided hereinabove relating to embodiments of the first aspect of the present invention. Particularly, functions of essential and/or optional components of a device or receiver circuit in accordance with embodiments of the present invention, as described hereinabove, may equally relate to method steps of a method in accordance with embodiments of the present invention.

An example is provided further hereinbelow for illustrating embodiments in accordance with the present invention, such examples not being intended to limit the invention in any way, but to aid in understanding the invention and reducing the invention to practice.

A device in accordance with embodiments of the present invention, e.g. using a trimmable RC oscillator as the clock signal generator, was found to be able to recognise all bits correctly for a sender clock deviation within +/−0.5% as well as for +55% dominant bit extension and/or insertion and for −5% dominant bit shortening, as required by the relevant CAN standards.

A calculation example for the oscillator accuracy is given hereinbelow, referring to the sample provided hereinabove with a ratio of the first clock signal to the baud rate ratio of $\frac{1}{16}$.

The CAN standard requires a window from +55% to 95% of bit time, thus forming a range of 40% of the bit time. A maximum of 0.5% clock deviation of the sender clock was taken into account, pursuant the CAN standards. In a worst case, 5 dominant bits may be followed by 5 recessive bits, thus totaling the sender deviation to 10×0.5%=5%. Furthermore, in this example, the edge synchronisation has an uncertainty of one pulse length of the sampling clock, i.e. the first clock signal, e.g. $\frac{1}{16}$ of the bit time or, equivalently, 6.25%. Thus, the remaining window is 40%, minus 5% for the sender tolerance, minus 6.25% sampling inaccuracy, resulting in 28.75%. Ideally, the sampling point is set at the middle of this range, thus at 95%−28.75%/2=80.625%. Therefore, if this sampling point can be matched exactly, an RC clock accuracy of +/−14% would be acceptable. In this example, the preferred sampling point may thus be set at $\frac{14}{16}$=87.5%. Therefore, in order to avoid violating the 95% upper bound if the window, a maximum RC oscillator tolerance of +/−7.5% may be allowable. Thus, this exemplary calculation illustrates that, with an accuracy in the range of +/−7.5% of the generated clock signal, the protocol requirements can be met.

A trimmable low power oscillator designed following state of the art methods can reach those requirements, e.g. even a smaller variation in the range of 5% can be realized. Therefore, embodiments of the present invention may allow a cost-efficient implementation, since a higher clock precision, such as provided by a crystal oscillator, may not be required.

The invention claimed is:

1. A receiver circuit for receiving an incoming bit stream obtained from an electronic communication bus-system and for processing said incoming bit stream, the receiver circuit comprising:
    a bit stream processor for bit stream synchronization and bit sampling of said incoming bit stream to provide a sampled output signal,
    a frame decoder for decoding a data frame encoded in said sampled output signal,
    a clock signal generator for generating a first clock signal and for supplying said first clock signal to said bit stream processor such that said bit stream processor operates at the frequency of the first clock signal,
    a clock signal downsampler for generating a second clock signal having a lower frequency than the first clock signal, said second clock signal being generated based on a co-occurrence of a clock pulse in the first clock signal and the emission of a bit in the sampled output signal provided by the bit stream processor, and for providing said second clock signal to said frame decoder, such that said frame decoder operates at the frequency of said second clock signal,
    wherein said bit stream processor is adapted for synchronizing the first clock signal to an external protocol timing of said incoming bit stream.

2. The receiver circuit of claim 1, wherein said frame decoder is adapted for decoding a data frame in said sampled output signal in accordance with a Controller Area Network protocol.

3. The receiver circuit of claim 1, wherein said receiver circuit comprises a wake-up decision unit for detecting a selective wake-up message in data frame information provided by the frame decoder and for generating a wake-up signal in response to said selective wake-up message, and wherein said second clock signal is provided to said wake-up decision unit such that said wake-up decision unit operates at the frequency of the second clock signal.

4. The receiver circuit of claim 1, wherein said clock signal downsampler generates said second clock signal as having a frequency corresponding to a baud rate frequency of the processed data stream.

5. The receiver circuit of claim 1, wherein said clock signal generator comprises an RC oscillator.

6. The receiver circuit of claim 1, wherein said bit stream processor comprises a synchronizer adapted for synchronizing said incoming bit stream to be in sync with said first clock signal and for generating a bus synchronization signal, and wherein said bit stream processor comprises an edge detector for detecting a falling edge pattern in said synchronized bit stream and generating a detected falling edge signal.

7. The receiver circuit of claim 6, wherein said edge detector comprises a shift register for storing data samples of the incoming bit stream and a comparator for detecting a falling edge by comparison of at least two values stored in the shift register and the bus synchronization signal provided by the synchronizer to a predetermined falling edge pattern such as to generate said detected falling edge signal.

8. The receiver circuit of claim 6, wherein said bit stream processor comprises an edge validator that comprises:
 a counter for restarting a count at each detected falling edge as conveyed by said detected falling edge signal,
 a sample selector for selecting samples from the digital input data after said detected falling edge at predetermined counter values of the counter, and
 a comparator for validating the selected samples to ascertain validity of said detected edge by majority voting, and for generating a valid edge signal.

9. The receiver circuit of claim 8, wherein said bit stream processor comprises a bit sampler that comprises a sample selector for taking a sample at a predetermined instant in a current bit frame and for providing said sample via said sampled output signal.

10. The receiver circuit of claim 9, wherein said sample selector is furthermore configured to select a plurality of data frame validation samples at a plurality of predetermined count values of said counter,
 wherein said bit sampler comprises a further comparator for applying a majority voting to detect a stable dominant state on said communication bus to detect a valid frame,
 wherein said bit sampler comprises a further counter that is configured to reset when said valid frame is detected and to reset when a predetermined count value, corresponding to a ratio of the frequency of said first clock signal and a transmission baud rate of said communication bus-system, is reached,
 wherein said sample selector is configured to take said sample at the predetermined instant in the current bit frame as indicated by a further predetermined count value of the further counter.

11. An integrated circuit device to transmit and/or receive data through an electronic communication bus-system, the device comprising a transceiver, wherein said transceiver comprises a bus-system connector for interfacing with the electronic communication bus-system and a receiver circuit in accordance with claim 1 to process incoming data obtained from the electronic communication bus-system via the bus-system connector.

12. The integrated circuit device of claim 11, wherein said integrated circuit device is a Controller Area Network node for transmitting and/or receiving data through the electronic communication bus-system in the form of a Controller Area Network bus-system.

13. The integrated circuit device of claim 12, wherein said integrated circuit device is adapted for supporting selective wake-up and/or partial networking of the Controller Area Network bus-system.

14. A method for processing an incoming bit stream obtained from an electronic communication bus-system, the method comprising:
 generating a first clock signal,
 using a bit stream processor to synchronize said first clock signal to an external protocol timing of said incoming bit stream and to bit-sample said incoming bit stream such as to provide a sampled output signal, said bit stream processor being clocked by the first clock signal,
 generating a second clock signal having a lower frequency than the first clock signal, said second clock signal being generated based on a co-occurrence of a clock pulse in the first clock signal and the emission of a bit in the sampled output signal provided by the bit stream processor, and using a frame decoder to decode a data frame encoded in said sampled output signal, said frame decoder being clocked by said second clock signal.

15. The method of claim 14, wherein said decoding of said data frame comprises decoding said data frame in accordance with a Controller Area Network protocol,
 the method furthermore comprising using a wake-up decision unit to detect a selective wake-up message in said decoded data frame and to generate a wake-up signal in response to said selective wake-up message, wherein said wake-up decision unit is clocked by said second clock signal.

* * * * *